United States Patent [19]
Akiyama et al.

[11] Patent Number: 6,109,660
[45] Date of Patent: Aug. 29, 2000

[54] CONNECTING STRUCTURE OF EXTERNALLY RESIN-COATED SMALL-DIAMETER METALLIC PIPE

[75] Inventors: Masaaki Akiyama, Sunto-gun; Kazunori Takikawa, Numazu; Masashi Kajiyama, Tagata-gun; Kazumi Fukaya, Mishima, all of Japan

[73] Assignee: Usui Kokusai Sangyo Kaisha Limited, Japan

[21] Appl. No.: 09/112,127

[22] Filed: Jul. 8, 1998

[51] Int. Cl.$^7$ ...................................................... F16L 11/12
[52] U.S. Cl. .............................. 285/45; 285/55; 285/226; 285/319; 285/322; 285/334.5; 285/353; 285/354; 285/906
[58] Field of Search .......................... 285/45, 55, 334.5, 285/226, 319, 322, 353, 354, 906

[56] References Cited

U.S. PATENT DOCUMENTS

| | | | |
|---|---|---|---|
| 3,549,176 | 12/1970 | Contreras | 285/55 |
| 4,114,929 | 9/1978 | Knapp | 285/45 |

FOREIGN PATENT DOCUMENTS

| | | | |
|---|---|---|---|
| 85968 | 3/1936 | Sweden | 285/45 |
| 1430364 | 3/1976 | United Kingdom | 285/45 |

*Primary Examiner*—Dave W. Arola
*Attorney, Agent, or Firm*—Anthony J. Casella; Gerald E. Hespos; Michael J. Porco

[57] ABSTRACT

A connecting structure of an externally resin-coated small-diameter metallic pipe having an excellent corrosion-resistant property with respect to a mating member is provided. According to the present invention, a resin-uncovered portion of the metallic pipe provided for applying an end processing thereon is completely covered with a protective pipe made of a resin material so that the processed pipe can be connected with the mating member without spoiling its anti-chipping property and an anti-splashing property of the metallic pipe over the entire length thereof. With the exception of the end of the metallic pipe corresponding to the margin at least required for applying an end processing on the pipe, the pipe is covered with an extrusion-moldable thick film-like resin and is connected with a mating member by means of a clamp nut assembled to the pipe end so as to be screw-fitted with the mating member. The connecting structure according to this invention features that one end of a resin pipe is fitted about the above-described resin coated layer on the metallic pipe while the other end of the resin pipe is inserted into, or fitted about, the clamp nut and the resin pipe is fixed to the clamp nut at least at a single portion thereof.

10 Claims, 6 Drawing Sheets

PRIOR ART

Fig. 16

PRIOR ART

Fig. 17

PRIOR ART

CONNECTING STRUCTURE OF EXTERNALLY RESIN-COATED SMALL-DIAMETER METALLIC PIPE

BACKGROUND OF THE INVENTION

1. Field of the Invention

The present invention relates to a brake pipe, a fuel pipe or the like for use with an automobile, especially a metallic pipe of a comparatively small diameter of less than 20 mm arranged below the body of the automobile and more particularly to a connecting structure of the small-diameter metallic pipe with respect to a mating member such as an end metal or joint, with the metallic pipe having the outer peripheral surface thereof covered with at least a thick film-like resin layer so as to have a corrosion-resistant property against chipping or splashing during traveling of the automobile and being subjected to an end processing such as the formation of a flare, a spool or a bulge at one end of the pipe by assembling a clamp nut by a after-processing.

2. Description of Prior Art

Recently, a number of resin-coated metallic pipes have been proposed for brake pipes, fuel pipes and other pipes arranged below an automobile so as to allow these pipes to have an anti-chipping property or anti-splashing property.

As such resin-coated metallic pipes, there have conventionally been known one that is provided with a polymeric coating layer formed such that a chromate film is formed according to necessity on a Zn or Zn/Ni film plated on the outer surface of a metallic pipe, then polyvinyl fluoride (PVF) is coated on the chromate film to a thickness of about 20 µm and a heat contractible tube is caused to cover the entire length of the chromate film to thereby form a polymeric coated layer and one that is formed such that a Zn or Zn/Al plated film is formed on the outer peripheral surface of a metallic pipe according to an electrical, chemical or hot-dipping method and a polyamid type resin (PA) such as PA11 or PA12 of a thickness of about 200–300 µm is extrusion-molded on the plated film.

However, in the conventional technology for manufacturing the first-mentioned conventional tube, since an expensive heat contractible tube is used over the entire length of the pipe, the manufacturing cost increases and further, since the technology includes the step of contracting the entire length of the tube after covering the heat contractible tube with the polyvinyl fluoride layer, much time and labor are required for manufacturing the tube thereby reducing productivity while the second mentioned conventional technology for manufacturing the tube, since the tube makes use of a thick film-like polyamide type resin as a single layer, when the tube is subjected to chipping or the like, the problem has arisen that the corrosion-resistant property of the pipe deteriorates.

Therefore, the present applicant proposed a metallic pipe having a surface treatment layer consisting of a plated film such as Zn was polymerously covered with a first layer and a second layer of which the first layer consisted of an adhesive and extrusion-moldable thin film-like polyamide type resin and the second layer consisted of an anti-chipping and extrusion-moldable thick film-like resin such as polypropylene, polyethylene or the above-mentioned polyamide type resin and laid over the first layer. (refer to Japanese Patent Application H9-145869). This polymeric coated metallic pipe has excellent characteristics that it has an excellent corrosion—resistant property without spoiling its anti-chipping and anti-splashing properties and it can be manufactured with ease.

In the case of the above-described polymerized coated metallic pipe, the pipe must be provided with a resin-uncovered portion required for performing a pipe end processing for enabling a clamp nut to be assembled to the metallic pipe and the formation of a flare, spool or bulge for the purpose of connecting the mating member such as an end metal or a joint to the pipe. Such resin-uncovered portion is required to have a clamp nut assembled thereto for its connection with a mating member such as a joint and has its one end press-worked by punch while causing the pipe end to be slightly projected so as to be held by a chuck for punch shaping so that it is necessary to secure at least a total length of the clamp nut, a chuck margin and a shaping margin. Accordingly, the resin uncovered portion is usually provided to a length of about 50–140 mm from the pipe end to be processed. Further, for the provision of such resin-uncovered portion, there is a method of peeling the thick film-like resin layer by an after-processing or a method for covering a pipe with a thick film-like resin layer over the entire length of the outer peripheral surface of the pipe with the exception of at least the pipe end corresponding to the working margin required during the manufacturing process.

Figure 15:
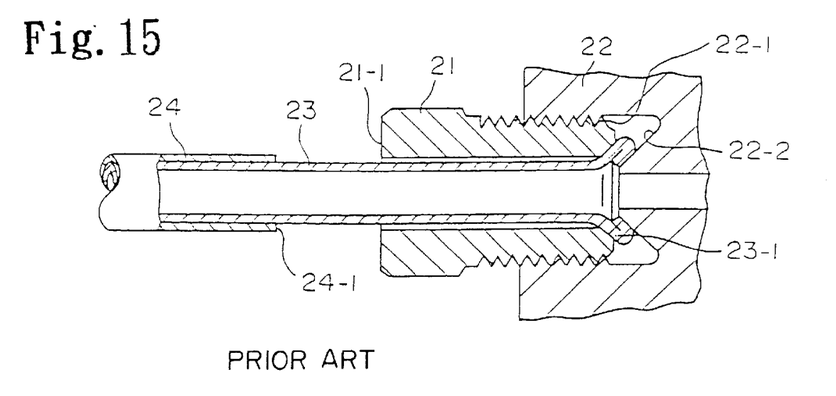
FIG. 15 is a sectional view of a connecting structure of an externally resin-coated small-diameter metallic pipe according to one embodiment of a conventional technology with the view being given for comparison purposes with respect to the present invention.
Figure 16:
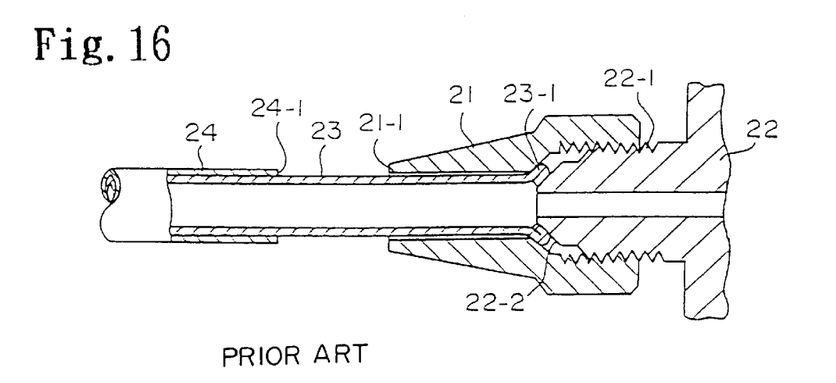
FIG. 16 is a sectional view of a connecting structure of an externally resin-coated small-diameter metallic pipe according to another embodiment of the conventional technology.

Then, where the metallic pipe with its one end having a resin-uncovered portion and subjected to an end processing is connected to a mating member, a clamp nut 21 assembled to the resin-uncovered portion at one end of the pipe is screw-fitted into a screw-threaded portion 21-1 of a joint 22 as the mating member so that a double-flare portion 23-1 formed as a result of end processing is connected by being brought into contact with a sheet-surface 22-2 of the joint 22, as shown in FIG. 15 as an example of a connecting structure. Further, FIG. 16 illustrates a connecting structure using a cap type clamp nut 21 instead of the male type clamp nut shown in FIG. 15 and in this case, the cap type clamp nut 21 is screw-fitted into the screw-threaded portion 22-1 of the joint 22 as the mating member and then clamped so that both members are connected to each other through contact of the end-processed double flare 23-1 of the metallic pipe 23 with the sheet surface 22-2 of the joint 22. Further, a connection structure example shown in FIG. 17 makes use of an O-ring flare 23-1$a$ in place of the above-mentioned double flare section 23-1 thereby securing the sealing property by interposing an O-ring 25 between the sheet surface 22-2 and the O-ring flare 231-1$a$ and this case also indicates a system in which the clamp nut 21 assembled to the resin-uncovered portion is screw-fitted into, and clamped to, the screw-threaded portion 22-1 of the joint 22 as a mating member.

Figure 17:
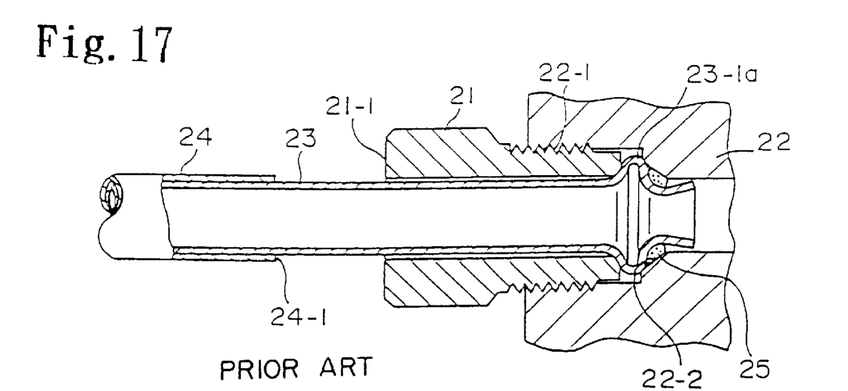
FIG. 17 is a sectional view of a connecting structure of an externally resin-coated small-diameter metallic pipe according to still another embodiment of the conventional technology.

However, in the case of such connecting structure, as will be clear from the drawings, due to the presence of the above-mentioned chuck margin and the movement of the clamp nut 21 toward the double flare portion 23-1 or the O-ring flare 23-1$a$ following the screw-fitting of the joint 22 into the screw-threaded portion 22-1, the resin-uncovered portion becomes widely exposed between the rear end surface 21-1 of the clamp nut 21 and the end surface 24-1 of the outer resin-coated layer 24. If this exposed resin-uncovered portion is left as it is, there is the possibility of that portion becoming damaged by chipping or muddy water or of causing deterioration of the corrosion-resistant property due to the possible generation of cracks so that it has been necessary to take some countermeasure against it.

SUMMARY OF THE INVENTION

The present invention has been made in view of such circumstances and an object of the present invention is to provide a connecting structure of an externally resin-coated small-diameter metallic pipe which has an excellent corrosion-resistant property without spoiling its anti-chipping property or anti-splashing property over the entire length of the metallic pipe by covering a resin-uncovered portion generating after the above-mentioned pipe connection, with a protective layer.

The gist of the present invention resides in that, with the exception of the pipe end portion corresponding to the processing (or working) margin which is required for the pipe end processing, in a connecting structure with which a small-diameter metallic pipe covered with an anti-chipping and extrusion-moldable thick film-like resin-coated layer is connected to a mating member through the screw-fitting and pressing of a clamp nut assembled to the end of the pipe, one end of a resin pipe is fitted about the above-described thick film-like resin-coated layer while the other end of the resin pipe is inserted into, or fitted about the clamp nut and the resin pipe is fixed to the clamp nut at least at a single position thereof.

By the way, as a means for attaching the above-described resin pipe according to the present invention, the following systems may be made use of.

That is, a system in which a collar is formed at one of the open ends of the resin pipe and the collar is fixed to the rear end surface of a clamp nut by caulking; a system in which a collar formed at one of the open ends of the resin pipe is fixed to the rear part of the clamp nut through the screw-fitting and pressing of a stop nut assembled to the resin pipe; a system in which one end of the resin pipe is fitted about a cylindrical flange projecting from the rear end surface of the clamp nut and the fitted connected portion is fixed by a fastener; a system in which one end of the resin pipe is fitted about a cylindrical flange projecting from the rear end surface of a clamp nut which is screw-fitted with the rear part of the clamp nut and the fitted connected portion is fixed by a fastener; a system in which a collar formed on one of the open ends of the resin pipe is fixed to the rear end surface of the clamp nut by caulking while the other open end is provided with an elastic seal ring; a system in which an inclined peripheral surface having a forwardly increasing diameter is formed on the inner peripheral surface of an enlarged-diameter chamber provided inside the rear end side of the clamp nut and a collet member comprising a cylindrical base wall portion provided with seal rings on the inner and outer peripheral surfaces thereof, respectively, a slit wall continuous with the base wall portion and having at the top portion thereof an inwardly directed claw-like wall and an outwardly directed projection wall is arranged within the enlarged-diameter chamber so as to slide with the outer peripheral surface of the resin pipe in the axial direction so that when the projection wall is brought into engagement with the inclined surface of the enlarged diameter chamber, the claw-like wall is pressed forward to become connected to the clamp nut, thereby completely covering the resin-uncovered portion with the resin pipe, a system in which a resin bellows pipe is used as a resin pipe, one of the open ends of the bellows pipe is fitted about a cylindrical flange formed to project from the rear end surface of a clamp nut and both ends of the resin bellows pipe are fixed by fasteners, a system in which a socket body having a pair of elastic engaging strips projecting from one side thereof is brought into engagement with an opening drilled in a large-diameter portion of a clamp nut for assembly and the elastic engaging strips are brought into contact with an annular bulged wall formed on the outer peripheral surface of the above-mentioned resin pipe to thereby fixing the resin pipe and a system in which an elastic engaging strip is provided in each of a plurality of openings drilled in the large-diameter portion of the clamp nut and the elastic engaging strip is brought into engagement with the annular bulged wall formed on the outer peripheral surface of the resin pipe.

DETAILED DSCRIPTION OF PREFERRED EMBODIMENTS

In the drawings, reference numeral 1 designates a clamp nut, reference numeral 2 designates a joint or end metal (hereinafter referred to as the "joint") as a mating member, reference numeral 3 designates a resin-coated small-diameter metallic pipe having a thick resin coated layer as an outermost layer, reference numeral 4 designates a thick film resin covering, reference numeral 5 designates a resin pipe, reference numeral 6 designates an elastic sealing ring, reference numeral 7 designates a stop nut, reference numeral 8 designates a clip, reference numeral 9 designates a collect, member, reference numeral 10 designates a resin bellows pipe and reference numeral 11 designates a socket body.

Further, in the present invention, the metallic pipe 3 includes a resin uncovered layer extending over the length of, for example, 50–140 mm from the connecting end thereof as described in the foregoing and the resin pipe 5 of a desired length is fitted about that resin-uncovered portion. Then the end of the resin pipe 5 on the side of the end of the mating member is moved up to the end of the thick resin coated layer 4 and after that, the end processing such as the formation of a double flare 3-1 and an O-ring flare 3-1 and the like is performed. In this case, the thick resin-coated layer 4 has at least an anti-chipping property and is made of an extrusion-moldable material such as polypropylene, polyethylene, or polyamid resin. Further, for the resin pipe 5, the same material as that of the thick resin-coated layer 4 over the small-diameter metallic pipe 3 may be used but an elastic rubber tube or a fluorine resin having a small coefficient of friction may also be used and further, although the thickness of the resin pipe 5 may be made the same as that of the above-mentioned resin-coated layer, it is possible to use a thin film-like resin material.

Figure 1:
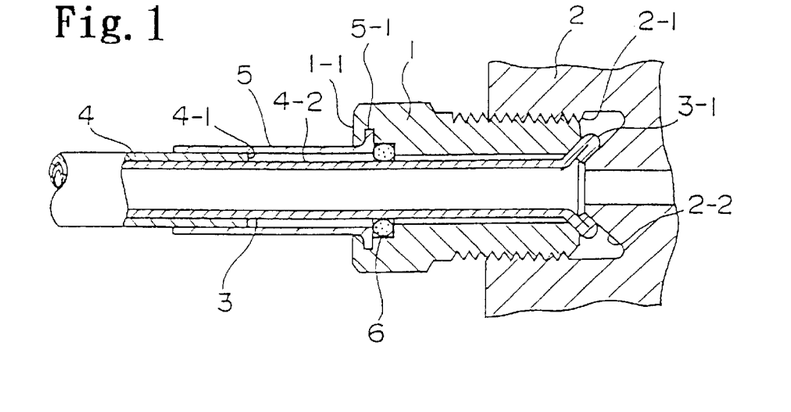
FIG. 1 is a sectional view of a connecting structure of an externally resin-coated small-diameter metallic pipe according to one embodiment of the present invention.

The first embodiment of the present invention shown in FIG. 1 indicates a connecting structure in which the male type clamp nut 1 assembled to the resin-uncovered portion is screw-fitted with a screw-threaded portion 2-1 of the joint 2 as a mating member so that a double flare 3-1 formed by the end processing on the small-diameter metallic pipe 3 is brought into contact with a sheet surface 2-2 of the joint 2, wherein a collar 5-1 is formed at one of open ends of the resin pipe 5 whose inner diameter is substantially the same as the outer diameter of the resin-coated small-diameter metallic pipe 3 and which has a length larger than the axial length of the resin-uncovered portion 4-2 formed between a rear end surface 1-1 of the clamp nut 1 and an end surface 4-1 of the externally resin-coated layer 4 in a state in which the double flare portion 3-1 formed by the end processing of the small-diameter resin pipe 3 is in pressure contact with the sheet surface 2-2 and the above-mentioned collar 5-1 is caulked to the rear end surface of the clamp nut 1 in a state in which the other open end of the resin pipe 5 is fitted about the externally resin-coated layer 4, to thereby completely cover the resin-uncovered portion 4-2 with the resin pipe 5. As a means for caulking the resin pipe 5, a system may be used in which a short cylindrical portion capable of fitting with the collar 5-1 of the resin pipe 5 is formed to project from the rear end surface of the clamp nut 1 and after fitting the collar 5-1 of the resin pipe 5 with the cylindrical portion, the cylindrical portion is bent inward for caulking.

Figure 2:
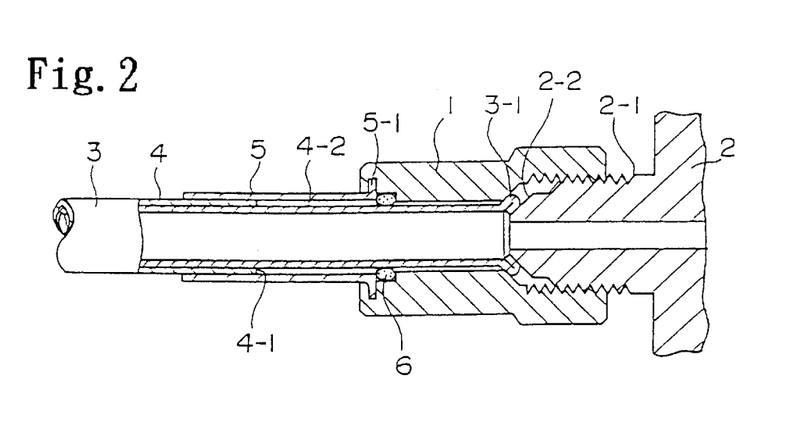
FIG. 2 is a sectional view of the same according to a second embodiment the present invention.

The second embodiment shown in FIG. 2 is an example of an application of a cap type clamp nut (female) 1, in place of the male type clamp nut 1 of FIG. 1, to a connecting structure wherein, in the structure in which the cap type clamp nut 1 is screw-fitted into the screw-threaded portion 2-1 of the joint 2 so that the double flare 3-1 formed by the end processing on the small-diameter metallic pipe 3 is brought into contact with the sheet surface 2-2 of the joint 2, the resin pipe 5 whose inner diameter is substantially the same as the outer diameter of the externally resin-coated small-diameter metallic pipe is caulked to the rear end surface of the cap type clamp nut 1 so that the resin-uncovered layer 4-2 is completely covered with the resin pipe 5.

Figure 3:
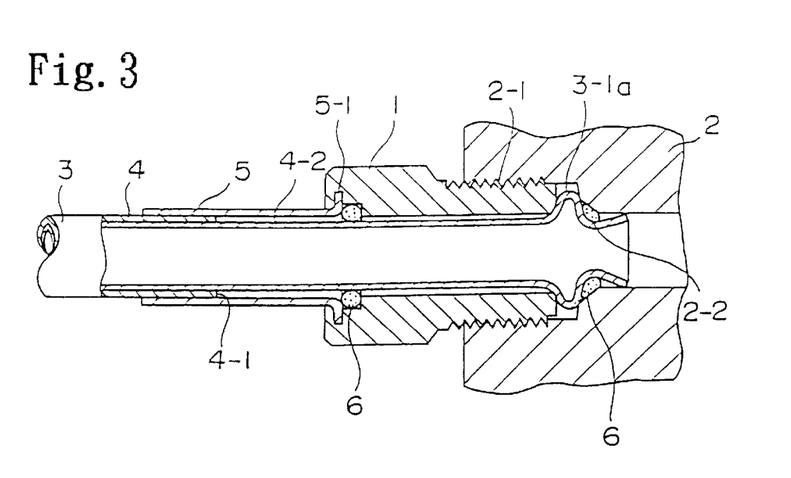
FIG. 3 is a sectional view of the same according to a third embodiment of the present invention.

The third embodiment shown in FIG. 3 is an example of an application of an O-ring flare 3-1a, in place of the double flare 3-1, to a connecting structure, wherein in the system in which the clamp nut 1 assembled to the resin-uncovered portion is connected to the joint 2 as the mating member by screw-fitting the clamp nut 1 into the screw-threaded portion 2-1 of the joint 2 and in a connecting structure in which an elastic seal ring 6 is interposed between the sheet surface 2-2 of the joint 2 and the O-ring flare 3-1a formed by the end processing on the small-diameter metallic pipe 3, the collar 5-1 of the resin pipe 5 having an inner diameter substantially the same as the outer diameter of the small-diameter metallic pipe is caulked to the rear end surface of the male clamp nut 1 so that, as in the case of the previous embodiment, the resin-uncovered portion 4-2 is completely covered with the resin pipe 5.

Figure 4:
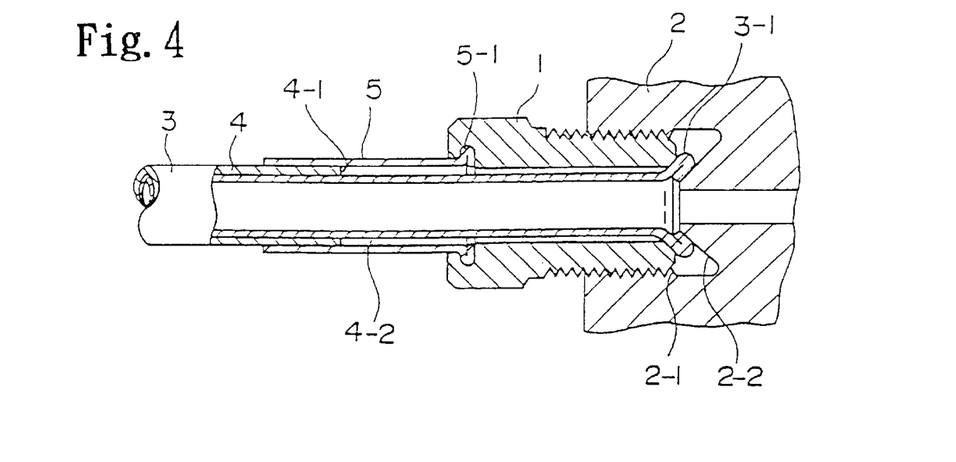
FIG. 4 is a sectional view of the same according to a fourth embodiment of the present invention.

The fourth embodiment shown in FIG. 4 is, as in the case of the connecting structure shown in FIG. 1, indicates a connecting structure in which the male type clamp nut 1 assembled to the resin-uncovered portion is screw-fitted with, and clamped to, the screw-threaded portion 2-1 of the joint 2 as the mating member as that the double flare 3-1 formed by an end processing on the small-diameter metallic pipe 3 is brought into contact with the sheet surface 2-2 of the joint 2 for connection, wherein the collar 5-1 of the resin pipe 5 is formed to be of double type and also in this case, the resin uncovered portion 4-2 is completely covered by the resin pipe 5. Further, as a means for caulking the resin pipe 5, a system may be used that a short cylindrical portion with which the collar 5-1 can fit is formed to project from the rear end surface of the clamp nut 1 and the cylindrical portion is bent inward for caulking while the collar 5-1 of the resin pipe 5 is held fitted with the cylindrical portion.

Figure 5:
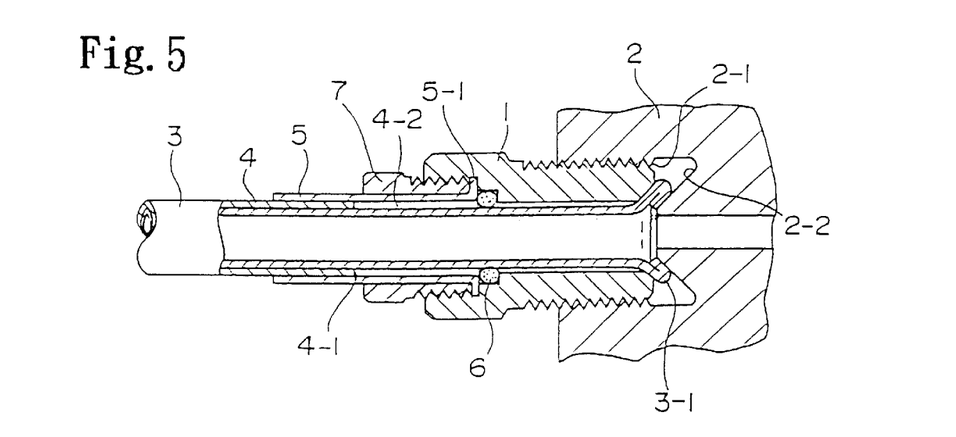
FIG. 5 is a sectional view of the same according to a fifth embodiment of the present invention.

As in the case of the connecting structure shown in FIG. 1, the fifth embodiment shown in FIG. 5 is a connecting structure in which the male clamp nut 1 assembled to the resin-uncovered portion is screw-fitted with the screw-threaded portion 2-1 of the joint as the mating member so that the double flare 3-1 formed by the end processing on the metallic pipe 3 is brought into contact with the sheet surface 2-2 of the joint 2, a stop nut 7 (as a fixing means for the resin pipe 5) to be screw-fitted with the rear part of the clamp nut 1 presses and clamps the collar 5-1 of the resin pipe 5 to the bottom of female screw-threaded hole of the clamp nut 1 so that the resin-uncovered portion 4-2 is completely covered by the resin pipe 5.

Figure 6:
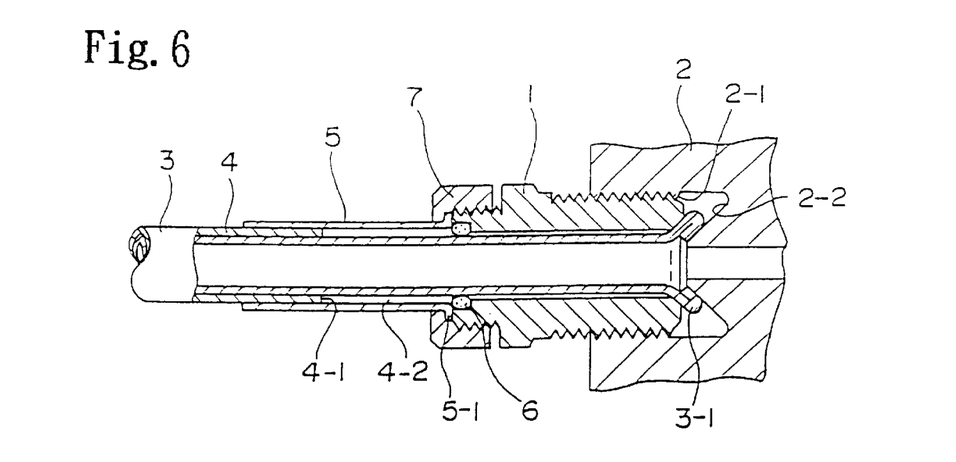
FIG. 6 is a sectional view of the same accor5ding to a sixth embodiment of the present invention.

The sixth embodiment shown in FIG. 6 is an example of a connecting structure in which in lieu of the male type stop nut 7 as the fixing means for the resin pipe in the connecting structure shown in FIG. 5, the cap stop nut 7 (female type) is used so that the resin pipe 5 is pressed against the rear end surface of the clamp nut 1 thereby completely covering the resin-uncovered portion 4-2 with the resin pipe 5.

Figure 7:
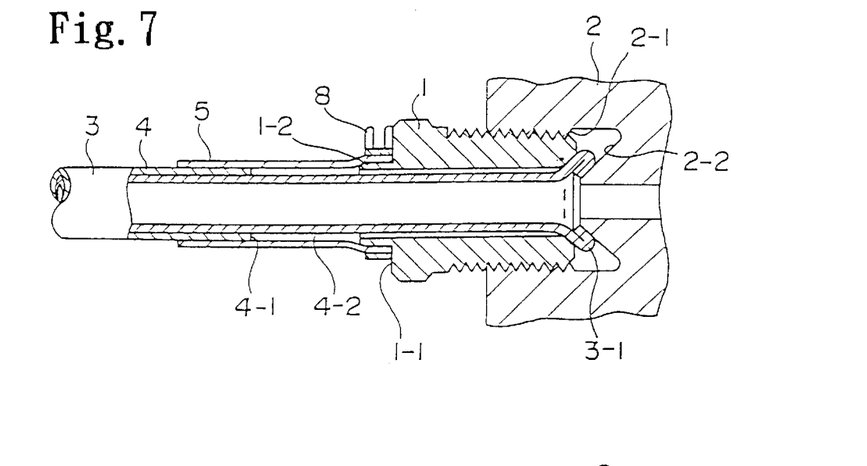
FIG. 7 is a sectional view of the same according to a seventh embodiment of the present invention.

The seventh embodiment shown in FIG. 7 indicates, as in the case of the connecting structure shown in FIG. 1, a connecting structure in which the male type clamp nut 1 assembled to the resin-uncovered portion is screw-fitted with the screw-threaded portion 2-1 of the joint 2 as the mating member so that the double flare 3-1 formed by the end processing on the small-diameter metallic pipe 3 is brought into contact with the sheet surface 2-2 of the joint 2, wherein as a means for fixing the cylindrical resin member 5, a resin pipe connecting short cylindrical flange 1-2 is formed to project from the rear end surface 1-1 of the clamp nut 1, the open end of the resin pipe 5 on the side of the clamp nut is fitted about the cylindrical flange 1-2 for connection and the outer periphery of the connection is clamped with a clip 8 thereby completely covering the resin-uncovered portion 4-2 with the resin pipe 5.

Figure 8:
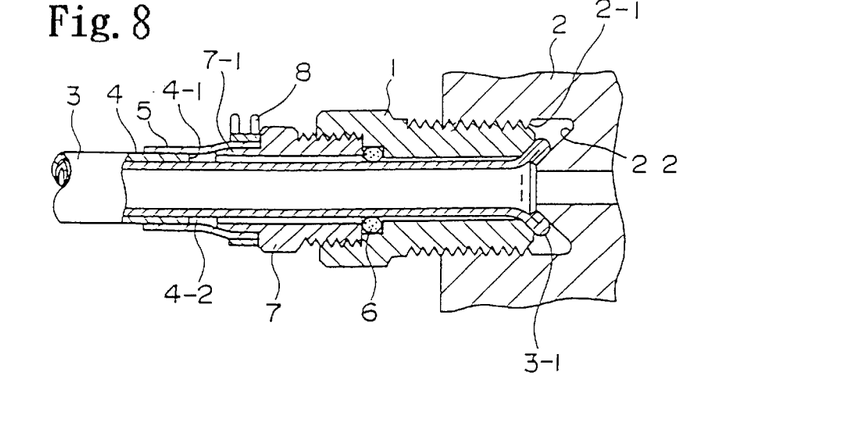
FIG. 8 is a sectional view of the same according to an eighth embodiment of the present invention.

The eighth embodiment shown in FIG. 8 indicates, as in the case of the connecting structure of FIG. 1, a connecting structure in which as a means for fixing the resin pipe 5, a resin pipe connecting short cylindrical flange 7-1 is formed to project from the rear end surface of the nut 7 screw-fitting with the rear part of the clamp nut 1 shown in FIG. 5 and, as in the case of the connecting system shown in FIG. 7, the open end of the resin pipe 5 on the side of the clamp nut 1 is fitted about the cylindrical flange 7-1 for connection and the outer periphery of the connection is clamped with the clip 8 thereby completely covering the resin-uncovered portion 4-2 with the resin pipe 5.

Figure 9:
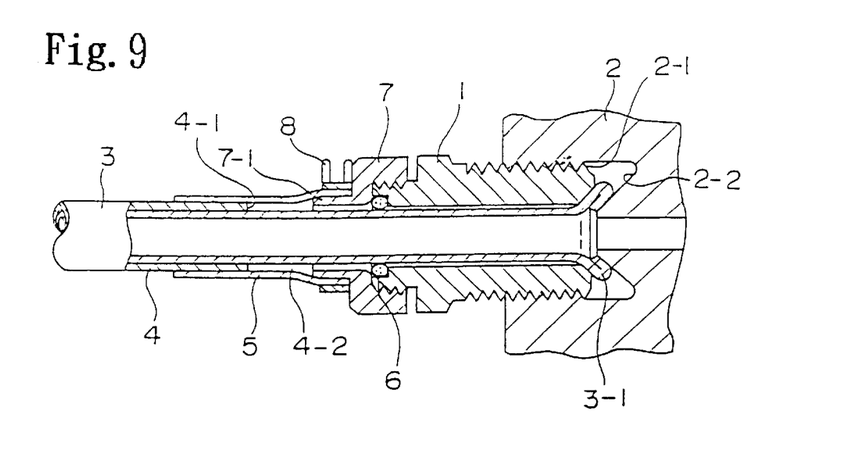
FIG. 9 is a sectional view of the same according to a ninth embodiment of the present invention.

The ninth embodiment shown in FIG. 9 indicates a connecting system in which the resin pipe 5 is connected by the cap nut 7 (female) in place of the male nut 7 as the resin pipe connecting means in the connecting structure shown in FIG. 8, wherein the open end of the resin pipe 5 on the side of the clamp nut 1 is fitted about the resin pipe connecting short cylindrical flange 7-1 formed to project from the rear end of the cap nut 7 and the outer periphery of the connection is clamped with the clip 8 thereby completely covering the resin-uncovered portion 4-2 with the resin pipe 5.

Figure 10:
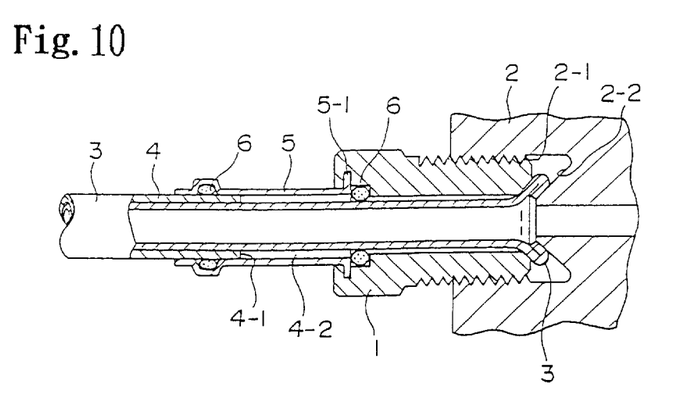
FIG. 10 is a sectional view of the same according to a tenth embodiment of the present invention.

The tenth embodiment shown in FIG. 10 indicates, as in the case of the connecting structure of FIG. 1, a connecting structure in which the collar 5-1 is formed at one of the open ends of the resin pipe 5 and then the collar 5-1 is caulked to the rear end surface of the clamp nut 1 in a state in which the other open end of the resin pipe 5 is fitted about the externally resin-covered layer 4 thereby completely covering the resin-uncovered portion with the resin pipe 5, wherein an elastic seal ring 6 is assembled to the polymerized portion of the resin pipe 5 and the externally resin-coated layer 4 so that the sealing property of the polymerized portion is improved and the concentration of stress on the flare due to vibrations is released.

Figure 11:
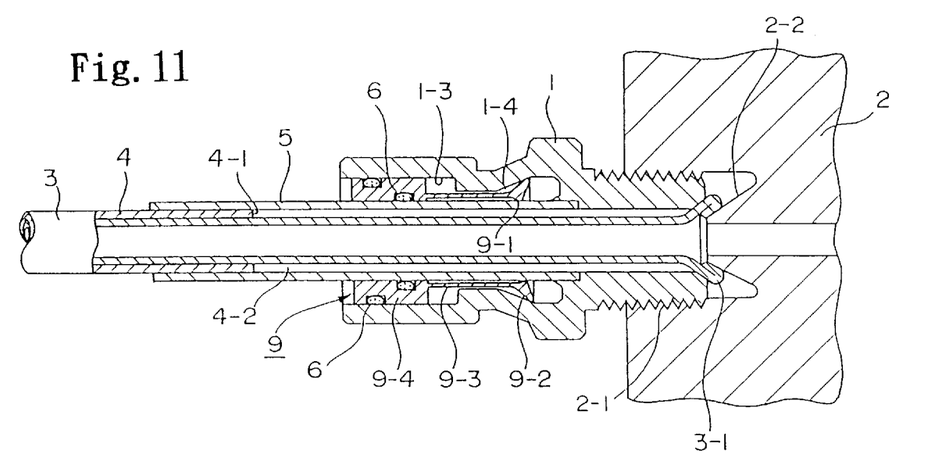
FIG. 11 is a sectional view of the same according to a eleventh of the present invention.

The eleventh embodiment shown in FIG. 11 indicates, as in the case of the connecting structure of FIG. 1, a connecting structure in which the male clamp nut 1 assembled to the resin-uncovered portion is screw-fitted with the screw-threaded portion 2-1 of the joint 2 as the mating member so that the double flare 3-1 formed by the end processing on the small-diameter metallic pipe 3 is brought into contact with the sheet surface 2-2 of the joint 2, wherein an inclined surface 1-4 having a forwardly increasing diameter is formed on the inner peripheral surface of an enlarged-diameter chamber 1-3 provided inside the rear end of the clamp nut and a collet member 9 comprising a cylindrical base wall 9-4 provided with seal rings 6 on the inner and outer peripheral surfaces thereof, respectively, a slit wall 9-3 continuous with the base wall portion 9-4 and having at the top portion thereof an inwardly directed claw-like wall 9-1 and an outwardly directed projection wall 9-2 is arranged within the enlarged-diameter chamber so as to become slide with the outer peripheral surface of the resin pipe 5 in the axial direction so that when projection wall 9-2 is brought into engagement with the inclined surface 1-4 of the enlarged-diameter chamber 1-3, the claw-like wall 9-1 is pressed forward to become connected to the clamp nut 1, thereby completely covering the resin-uncovered portion 4-2 with the resin pipe 5.

Figure 12:
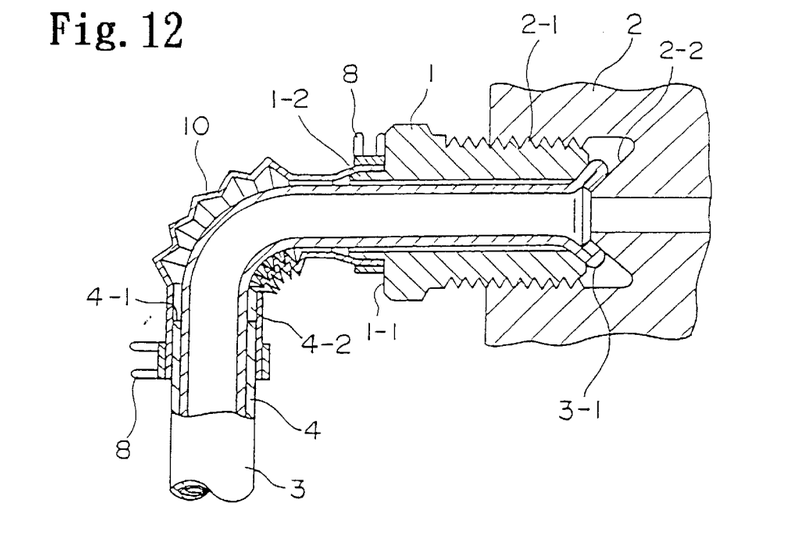
FIG. 12 is a sectional view of the same according to a twelfth embodiment of the present invention.

The twelfth embodiment shown in FIG. 12 is an example using a resin bellows pipe 10 as the resin pipe 5 and indicates, as in the case of the connecting structure shown in FIG. 7, a connecting structure in which the male clamp nut 1 assembled to the resin-uncovered portion is screw-fitted and clamped with the screw-threaded portion 2-1 of the joint 2 as the mating member so that the double flare 3-1 formed by the end processing on the small-diameter metallic pipe 3 bent at right angles is brought into contact with the sheet surface 2-2 of the joint 2, the resin pipe connecting short cylindrical flange 1-2 as a means for fixing the resin bellows pipe 10 is formed to project from the rear end surface 1-1 of the clamp nut 1, the open end of the resin bellows pipe 10 on the side of the clamp nut is fitted about the cylindrical flange 1-2 for connection and the outer periphery of the connection and the connecting portion of the resin coated layer 4 are clamped by the clips 8 thereby completely covering the resin uncovered portion 4-2 with the resin bellows pipe 10.

Figure 13:
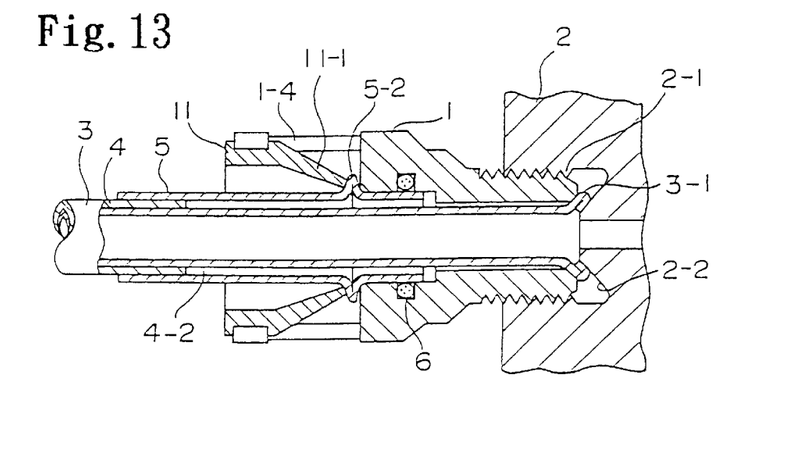
FIG. 13 is a sectional view of the same according to a thirteenth embodiment of the present invention.

The thirteenth embodiment shown in FIG. 13 is an example of fixing the resin pipe by a quick connector system and indicates, as in the case of the connecting structure shown in FIG. 1, a connecting structure in which a male clamp nut 1 assembled to the resin-uncovered portion is screw-fitted with the screw-threaded portion 2-1 of the joint 2 as the mating member so that the double flare 3-1 formed by the end processing on the small-diameter metallic pipe 3 bent at right angles is brought into contact with the sheet surface 2-2 of the joint 2, wherein a socket body 11 having a pair of elastic engaging strips 11-1 projecting from one side of the socket are brought into engagement with an opening 1-4 drilled in the large-diameter portion of the clamp nut for assembly while an annular bulged wall 5-2 is formed on the outer periphery of the top end of the resin pipe 5, the top end of the resin pipe 5 is inserted into the clamp nut 1 so as to bring the annular bulged wall 5-2 into contact with the inner wall of the opening 1-4 and then the clamp nut is clamped so that the elastic engaging strip 11-1 is brought into engagement with the bulged wall 5-2 to fix the resin pipe 5 thereby completely covering the resin-uncovered portion 4-2 with the resin pipe 5.

Figure 14:
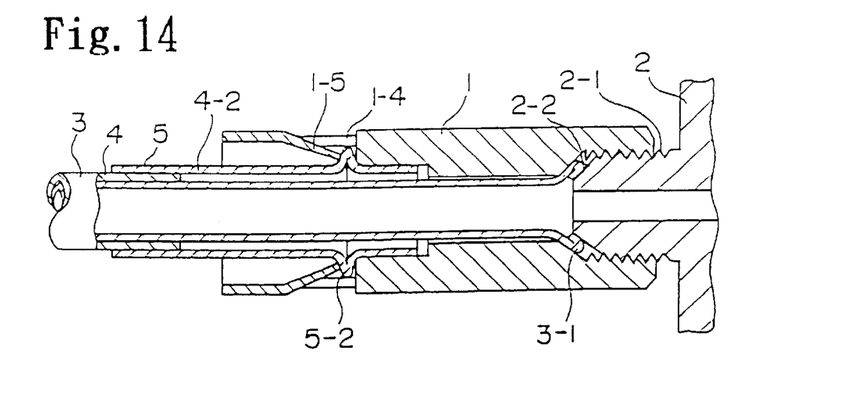
FIG. 14 is a sectional view of the same according to a fourteenth embodiment of the present invention.

Likewise, the fourteenth embodiment shown in FIG. 14 is another example of fixing the resin pipe according to a quick connector system and this embodiment is an example of application of the present invention to a connecting structure using a cap type clamp nut (female) 1 instead of the male clamping nut 1 as in the case of the connecting structure shown in FIG. 2. That is, in a connecting structure in which the cap clamp nut 1 is screw-fitted with the screw-threaded portion 2-1 of the joint 2 as the mating member and clamped so that the double flare 3-1 formed by the end processing on the small-diameter metallic pipe 3 is brought into contact with the sheet surface 2-2 of the joint 2 for connection, an elastic engaging strip 1-5 is integrally formed with each of a plurality of openings 1-4 drilled in the large-diameter portion of the clamp nut 1 and the elastic engaging strip 1-5 is caused to engage the annular bulged wall 5-2 formed on the outer periphery of the resin pipe 5 thereby completely covering the resin-uncovered portion 4-2 with the resin pipe 5.

In the above-described embodiments, a description has been made of a case where a resin-uncovered portion is provided over a range of 50–140 mm from the pipe end, the present invention is not limited thereto and such portion may be suitably provided even outside such a range. Further, in the embodiments shown in FIGS. 1 through 14 with the exception of FIG. 12, an example is shown in which the resin pipe 5 is fixed only on the side of the clamp nut but its connecting side with respect to the resin-coated layer 4 may be fixed by using a stop metal such as a clip or an adhesive according to necessity.

What is claimed is:

1. A connecting structure of an externally resin-coated small-diameter metallic pipe characterized in that said metallic pipe is provided with an anti-chipping and extrusion-moldable thick film-like resin coated layer on the outer peripheral surface thereof extending over substantially the entire length thereof with the exception of at least one end portion; a clamp nut assembled to the one end portion of the pipe, the clamp nut having a front end surface facing away from the resin-coated layer and a rear end surface facing the resin-coated layer; a resin pipe having opposed inner and outer surfaces and opposed first and second ends, the inner surface at the first end being fitted about the resin-coated layer of the metallic pipe and the inner surface at the second end of the resin pipe being engaged with the rear end surface of the clamp nut; and fastener means for securely engaging the outer surface of the second end of the resin pipe and clamping and connecting the second end of the resin pipe with the clamp nut.

2. The connecting structure of the externally resin-coated small-diameter metallic pipe according to claim 1, wherein said end portion of the pipe is provided with an end processing selected from the group consisting of a flare and a bulge.

3. The connecting structure of an externally resin-coated small-diameter metallic pipe according to claim 1, wherein said thick film-like resin coated layer is formed from a resin selected from the group consisting of polyprogylene, polyethylene and polyamid type resin.

4. The connecting structure of the externally resin-coated small-diameter metallic pipe according to claim 1, wherein said resin pipe is made from a material selected from the group consisting of rubber and fluorine type resin.

5. The connecting structure of the externally resin-coated small-diameter metallic pipe according to claim 1, wherein said clamp nut is selected from the group consisting of a male clamp nut and a cap type clamp nut.

6. The connecting structure of the externally resin-coated small-diameter metallic pipe according to claim 1, wherein said fastener means included said resin pipe having a collar being caulked to the rear end surface of said clamp nut.

7. The connecting structure of the externally resin-coated small-diameter metallic pipe according to claim 1, wherein said fastener means included said resin pipe having a collar at the second end, said resin pipe and said clamp nut being fixed to each other by fixing said collar of said resin pipe to the rear end of said clamp nut through a screw-fitting and pressing of a stop nut assembled to said resin pipe.

8. The connecting structure of the externally resin-coated small diameter metallic pipe according to claim 7, further comprising an elastic seal ring at the second end of said resin pipe.

9. A connecting structure of an externally resin-coated small-diameter metallic pipe characterized in that said metallic pipe is provided with an anti-chipping and extrusion-moldable thick film-like resin coated layer on the outer peripheral surface thereof extending over substantially the entire length thereof with the exception of at least one end portion; a clamp nut assembled to the one end portion of the pipe, the clamp nut having a front end surface facing away from the resin-coated layer and a rear end surface facing toward the resin-coated layer, a cylindrical flange formed to project from the rear end surface of said clamp nut; a resin pipe having a first end fitted about the resin-coated layer of the metallic pipe and a second end engaged over the cylindrical flange projecting from the rear end surface of the clamp nut; and a fastener surrounding portions of the resin pipe engaged over the cylindrical flange to thereby connect and clamp said resin pipe about said flange.

10. The connecting structure of the externally resin-coated small-diameter metallic pipe according to claim 9, wherein said resin pipe is a resin bellows pipe, about said cylindrical flange projecting from the rear end surface of said clamp nut and the ends of said resin bellows pipe being clamped, respectively, to the resin-coated layer and the cylindrical flange.

* * * * *